United States Patent [19]

Hanly, Sr.

[11] Patent Number: 4,843,667
[45] Date of Patent: Jul. 4, 1989

[54] WORK IMPLEMENT

[76] Inventor: James M. Hanly, Sr., P.O. Box 259, Lafitte, La. 70067

[21] Appl. No.: 236,837

[22] Filed: Aug. 26, 1988

[51] Int. Cl.$^4$ ............................................. A01B 1/00
[52] U.S. Cl. .................................... 7/114; 56/400.06; 56/400.19
[58] Field of Search ................. 7/114, 158; 15/159 R, 15/176; 56/400.04, 400.06, 400.17, 400.19

[56] References Cited

U.S. PATENT DOCUMENTS

| | | | |
|---|---|---|---|
| 3,221,485 | 12/1965 | Jenkins | 56/400.06 |
| 4,122,570 | 10/1978 | Otken et al. | 7/114 |
| 4,236,742 | 12/1980 | Florence | 56/400.19 X |
| 4,483,133 | 11/1984 | Pasley | 56/400.17 X |

Primary Examiner—James G. Smith
Attorney, Agent, or Firm—Richard C. Litman

[57] ABSTRACT

A combination rake, broom and pruning knife is disclosed. The invention features a detachable broom head which when in place serves as a backing for the rake. The rake tines are retractable into the handle. The invention also features a knife with a handle that is threaded at both ends. The blade end of the knife may be inserted in the handle for storage. The knife may be screwed into the handle to form a pruning knife.

5 Claims, 3 Drawing Sheets

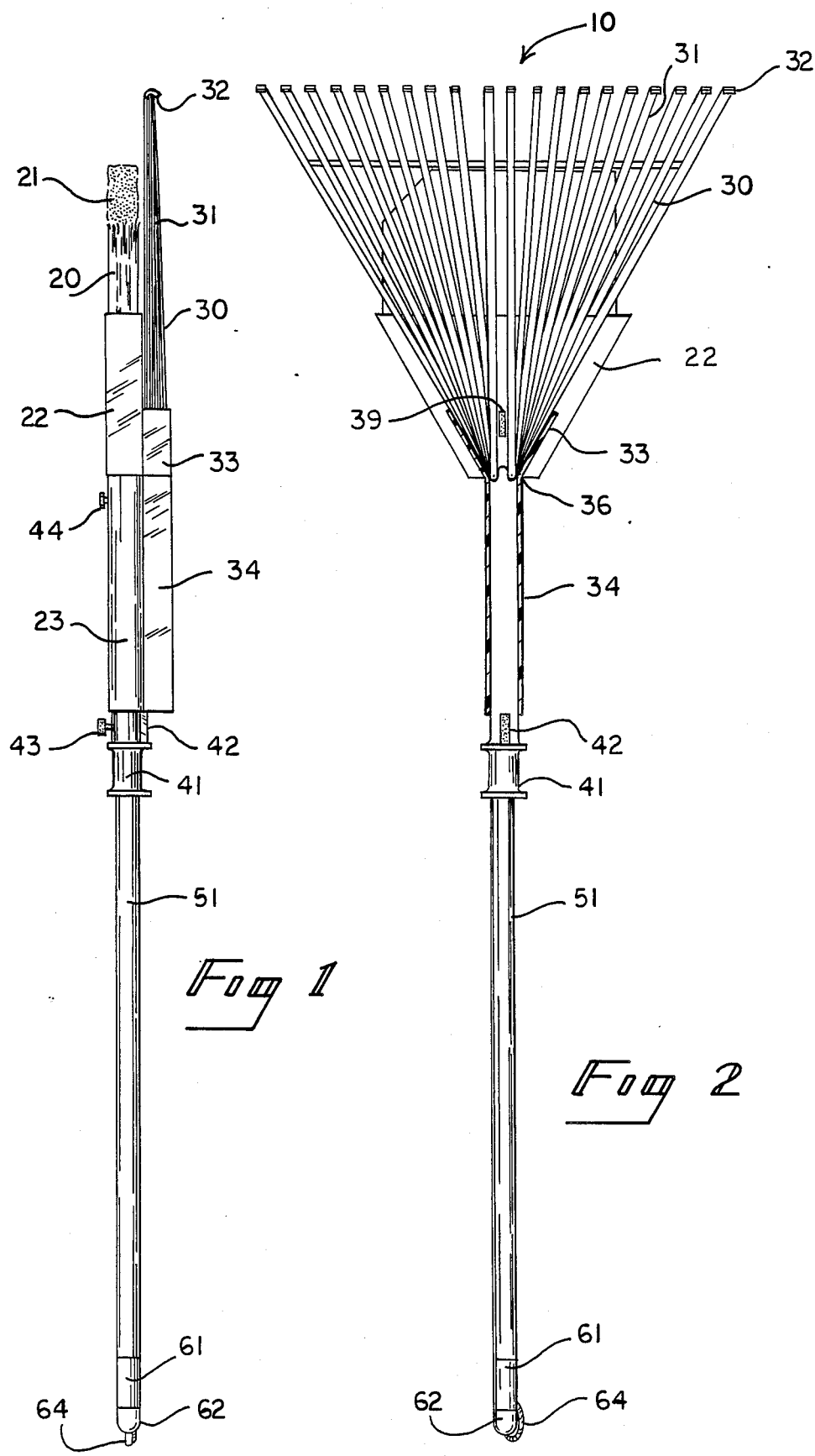

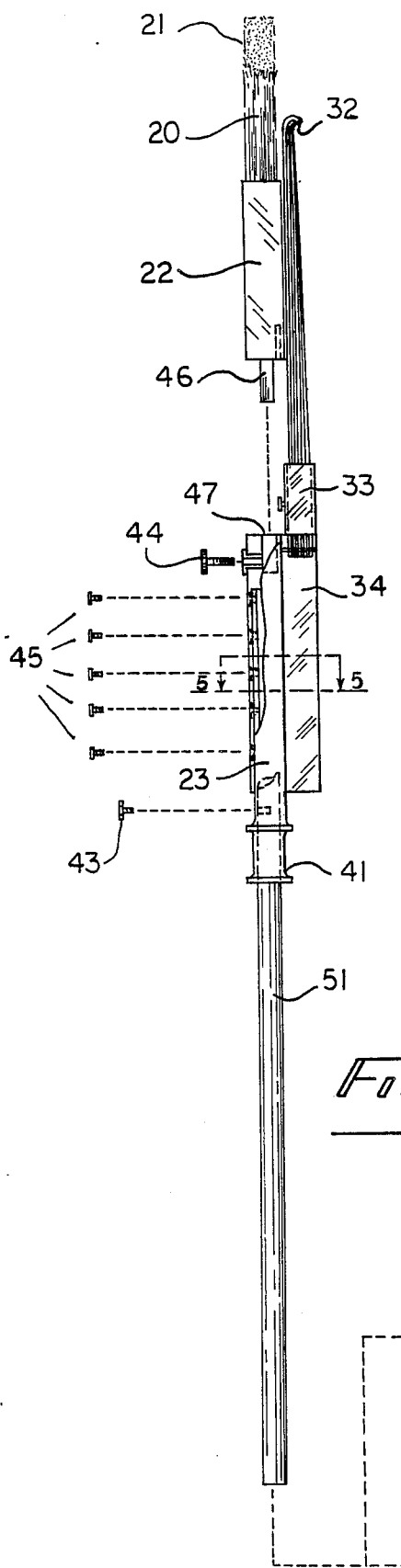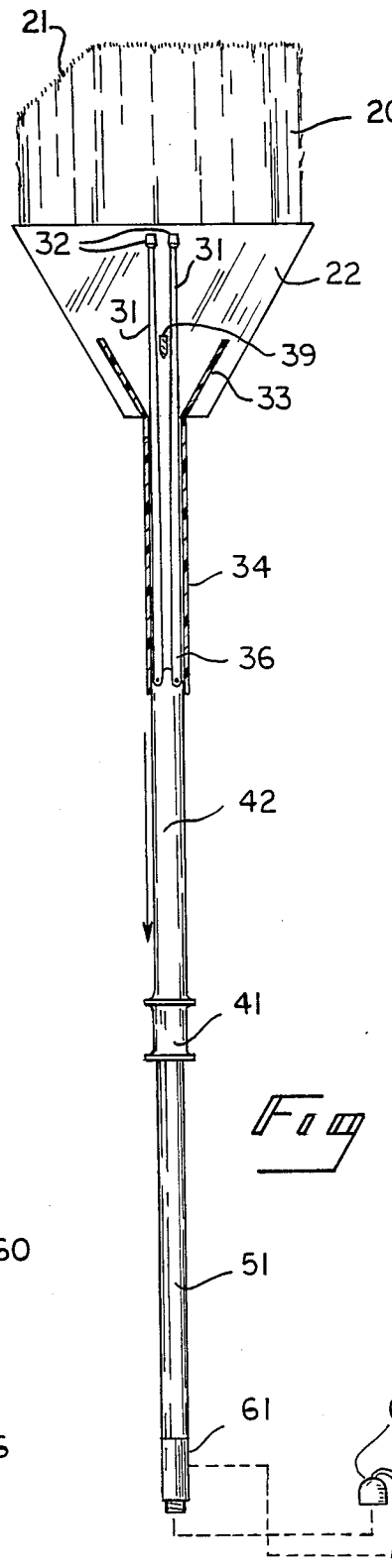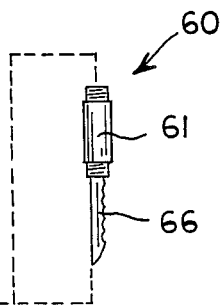

WORK IMPLEMENT

BACKGROUND OF INVENTION

The invention relates to a combination work implement, and more particularly, the invention is directed to an improved combination broom, rake, and pruning knife for use as a household, yard, garden, or industrial tool.

The invention further relates to an improved retractable rake, which retracts into a hollow casing by means of a slide handle. In addition, the invention is directed to a detachable broom head which serves as a backing for the rake. With the broom head removed, the rake is also retractable into a twopronged claw. The device also is directed to providing a reversible knife which is attached by threads to the handle end of the tool.

The invention provides a fully integrated tool, which can be used for a wide variety of raking, cleaning, and cutting activities, and the method of construction of the device is more fully described herein.

DESCRIPTION OF THE PRIOR ART

Various prior art raking, sweeping and cutting tools and combination work implements and the like as well as their apparatuses and the method of their construction in general, are known and found to be exemplary of the U.S. prior art. U.S. Pat. No. 3,733,636 to Osadsky discloses a combination broom, shovel, and scraper. The shovel and scraper are slidably mounted on opposite sides of the broom an serve as a backing for the broom. U.S. Pat. No. 4,109,338 to Mertes discloses broom and dustpan combination. U.S. Pat. No. 4,475,757 to Glock discloses a spade where the handle may serve to receive a tool stored within the handle such as as saw blade. U.S. Pat. No. 1,916,052 to Jenkins teaches a hand rake with longitudinal movement to telescopically retract the tines.

These patents or known prior uses teach and disclose various types of combination tools and the like, as well as methods of their construction; but none of them, whether taken singly or in combination, disclose the specific details of the combination of the invention in such a way as to bear upon the claims of the present invention.

SUMMARY OF THE INVENTION

An object, advantage, and feature of the invention is to provide a novel combination tool that is versatile and efficient in use, and lends itself to a variety of cleaning and cutting activities such as raking, sweeping and cutting.

Another object of the invention is directed further to a combination tool of the type described providing for a set of rake tines that are easily retractable by means of a sliding hand grip, and which when retracted form a two-pronged claw.

Another object of the invention is to provide a novel and improved construction of a handle for a combined broom, rake, and pruning knife, to wit, the employment of a hollow handle and a secondary shaft which encloses the rake when retracted.

Another object of the invention is to provide a novel and improved construction of a combination broom, rake, and pruning knife which includes a reversible pruning knife attached to the handle.

Still another object of the invention is to provide a broom which serves as a backing and deflection support for the tines of the rake, so that the rake tines are supported. The broom serves to further keep leaves or debris from becoming caught in the tines and clogging the tines.

These, together with objects and advantages of the invention reside in the details of the process and the operation thereof, as is more fully hereinafter described and claimed. References are made to drawings forming a part hereof, wherein like numerals refer to like parts throughout.

DESCRIPTION OF THE SEVERAL VIEWS OF THE DRAWINGS

FIG. 1 is a top view of a combination tool according to a preferred embodiment and best mode of the present invention.

FIG. 2 is a side view of a combination tool according to a preferred embodiment and best mode of the present invention.

FIG. 3 is a top view of a combination tool according to a preferred embodiment and best mode of the present invention, showing the broom head removed.

FIG. 4 is a side view of a combination tool according to a preferred embodiment and best mode of the present invention, showing the rake tines retracted.

DESCRIPTION OF THE PREFERRED EMBODIMENT OF THE INVENTION

Figure 5:
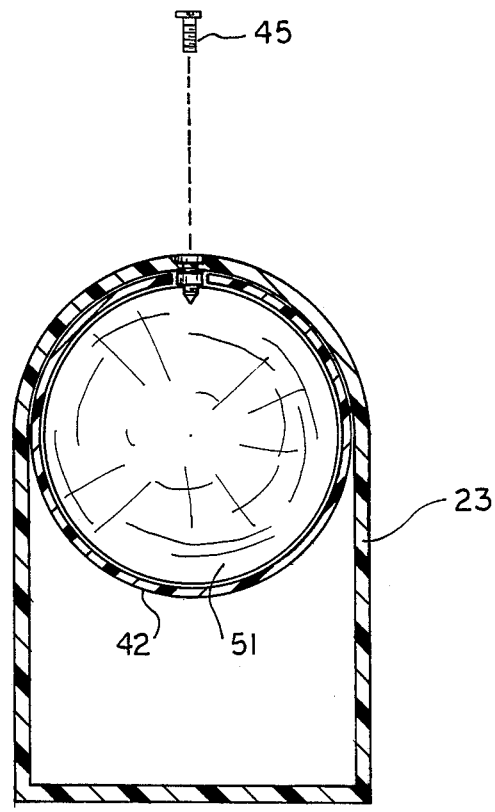
FIG. 5 is a section view of the handle and rake retraction linkage of the present invention.

Referring now to the drawings, in which like numerals refer to like parts throughout, there is shown a combination rake, broom, and pruning knife, generally designated 10. FIGS. 1 and 2 show the combination tool including an elongated handle 51. The handle has at one end a broom head 22, which supports a broom portion 20. The broom may be provided with a beveled corner 21 as shown. The entire broom assembly 20 is removable by means of a post 46 which fits in a socket 47. The broom assembly may be locked in place by a lock screw 44. The broom support chamber 23 is attached to the handle 51 by means of a number of screws 45.

The invention also includes a rake portion generally designated 30. A rake tine support chamber 33 is mounted parallel to the broom support chamber 22, as shown. The rake tine support chamber provides mounting and support for a plurality of rake tines 31, which may be provided with hooked ends 32. The retractable rake tines 31 are arranged in two groups, one on each side of the centerline of the tool, each having a similar number of tines. Each group of rake tines 31 is attached by a pivot pin 36 to a sliding linkage 42. When the tines are extended, they are supported by the flared end 33 of rake tine support chamber 34. When the tines 31 are extended, the broom head 22 serves as a backing for the rake tines 31. In this capacity, the broom head 22 limits deflection of the rake tines 31, and helps prevent debris from clogging the tines. The rake tines 31 may be retracted by pulling the sliding hand grip 41. The tines 31 when retracted slide partially into the rake retraction chamber 34.

The retracted tines 31, as shown in FIG. 4, form two prongs separated by a tine separator 39. The two prongs may be useful in a variety of scraping or cleaning applications. The sliding linkage 42 may be locked in the retracted or expended position by a lock screw 43. As shown in FIG. 5, The sliding linkage 42 has a cut out portion to provide clearance from the screws 45.

It can be readily seen that in use the operator may remove the broom head 22 and retract the tines 31, thereby providing a two-pronged claw which is useful for reaching into corners or narrow areas.

The end of handle 51 has a threaded end which accepts a knife handle 61. The knife 60 includes a knife or saw blade 66 extending therefrom. The handle 51 is adapted so that the knife 60 may be installed on the end of the handle in a storage portion as shown in FIGS. 1 and 2. The handle 61 is provided with a cap 62 joined thereto by a strap 64. The cap 62 may be used as an end cap when the blade 66 is in the storage position. Alternatively, the knife 60 may be removed for use as a hand tool. Further, the knife 60 can be installed extending from the end of handle 51, to provide a tree pruner which can reach elevated branches.

The foregoing is considered as illustrative only of the principles of the invention. Further, since numerous modifications and changes will readily occur to those skilled in the art, it is not desired to limit the invention to the exact construction shown and described, and accordingly, all suitable modifications, and equivalents which may be resorted to, fall within the scope of the invention.

I claim:

1. A work implement, comprising;
    an elongated handle;
    a removable broom head attached to one end of said elongated handle;
    a rake supporting chamber attached parallel to and offset from said elongated handle;
    a plurality of rake tines movable between first and second operational positions, said rake tines in said first operational position extending from said rake support chamber, said rake tines in said second operational position are retracted substantially into said rake support chamber;
    means for retracting said rake tines into said rake support chamber.

2. A work implement according to claim 1, further including;
    a removable knife attached to the other end of said elongated handle.

3. A work implement according to claim 1, further including;
    means to lock said broom head on said handle.

4. A work implement according to claim 1, further including;
    means to secure said means for retracting said rake tines, whereby said rake tines may be locked in a fixed position.

5. A work implement according to claim 1, wherein;
    said means for retracting said rake tines into said rake support chamber further includes;
    a hand grip slidably disposed along said elongated handle;
    a linkage connecting said hand grip to said rake tines;
    whereby manipulation of said hand grip causes retraction or extension of said rake tines.

* * * * *